(12) United States Patent
Hardwick et al.

(10) Patent No.: US 10,208,468 B2
(45) Date of Patent: Feb. 19, 2019

(54) MAINTENANCE MODE FOR AIRCRAFT VACUUM TOILET

(71) Applicant: B/E AEROSPACE, INC., Wellington, FL (US)

(72) Inventors: Christopher Hardwick, Roscoe, IL (US); Thao Hoang, Rockford, IL (US); Bradley J. Buniak, Schaumburg, IL (US); Christian C. Kurshinsky, Rockford, IL (US); William Pedersen, Rockford, IL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 30 days.

(21) Appl. No.: 15/084,317

(22) Filed: Mar. 29, 2016

(65) Prior Publication Data

US 2016/0289939 A1    Oct. 6, 2016

Related U.S. Application Data

(60) Provisional application No. 62/140,260, filed on Mar. 30, 2015.

(51) Int. Cl.
*E03D 9/00* (2006.01)
*B64D 11/02* (2006.01)
(Continued)

(52) U.S. Cl.
CPC ............... *E03D 9/00* (2013.01); *B64D 11/02* (2013.01); *E03D 5/012* (2013.01); *E03D 5/10* (2013.01);
(Continued)

(58) Field of Classification Search
CPC ....................................................... E03D 9/00
(Continued)

(56) References Cited

U.S. PATENT DOCUMENTS

| 2,680,714 A | 6/1954 | Carlsson et al. |
| 2,708,033 A | 5/1955 | Thomas |

(Continued)

FOREIGN PATENT DOCUMENTS

| EP | 1818462 A1 | 8/2007 |
| EP | 2050882 B1 | 9/2015 |

(Continued)

OTHER PUBLICATIONS

Non-Final Office Action on U.S. Appl. No. 15/084,185, dated Apr. 7, 2017, 14 pages.
(Continued)

*Primary Examiner* — Christine Skubinna
(74) *Attorney, Agent, or Firm* — Donna P. Suchy

(57) ABSTRACT

A method of controlling an operation of a toilet system on-board an aircraft is disclosed. The toilet system includes a toilet bowl, a fluid valve controlling input of fluid into the toilet bowl, a flush switch configured to be activated by a user, and a controller configured to operate the fluid valve. The method includes detecting an activation of the flush switch, monitoring a flush switch activation time period, and determining whether the flush switch activation time period exceeds a preset threshold time period. In response to determining that flush switch activation time period does not exceed the preset threshold time period, a standard flush cycle is initiated. In response to determining that the flush switch activation time period exceeds the preset threshold time period, a maintenance mode is initiated allowing a larger volume of fluid to fill the toilet bowl for maintenance.

6 Claims, 7 Drawing Sheets

(51) Int. Cl.

| | | |
|---|---|---|
| *E03D 11/13* | (2006.01) | |
| *E03D 5/10* | (2006.01) | |
| *E03D 5/012* | (2006.01) | |
| *F16K 3/04* | (2006.01) | |
| *F16K 31/04* | (2006.01) | |
| *F16K 31/46* | (2006.01) | |
| *E03D 11/16* | (2006.01) | |
| *E03F 1/00* | (2006.01) | |

(52) U.S. Cl.
CPC ............ *E03D 11/13* (2013.01); *E03D 11/135* (2013.01); *E03D 11/16* (2013.01); *E03F 1/006* (2013.01); *F16K 3/04* (2013.01); *F16K 31/047* (2013.01); *F16K 31/465* (2013.01)

(58) Field of Classification Search
USPC ........................................................ 4/252.1
See application file for complete search history.

(56) References Cited

U.S. PATENT DOCUMENTS

| | | |
|---|---|---|
| 2,878,829 A | 3/1959 | Folmsbee |
| 3,411,162 A | 11/1968 | Palmer |
| 3,447,777 A | 6/1969 | Carlson |
| 3,510,099 A | 5/1970 | Crump |
| 3,616,617 A | 11/1971 | De Groote |
| 3,719,957 A | 3/1973 | Riedel |
| 3,722,850 A | 3/1973 | Kemper |
| 3,835,479 A | 9/1974 | Milette et al. |
| 3,860,973 A | 1/1975 | Uyeda et al. |
| 3,902,876 A | 9/1975 | Moen et al. |
| 3,939,500 A | 2/1976 | Miller et al. |
| 3,995,328 A | 12/1976 | Carolan et al. |
| 4,041,554 A | 8/1977 | Gregory et al. |
| 4,237,934 A | 12/1980 | Gregory et al. |
| 4,289,611 A | 9/1981 | Brockmann |
| 4,376,314 A | 3/1983 | Iwans |
| 4,438,781 A | 3/1984 | Brenholt |
| 4,469,497 A | 9/1984 | Linhardt |
| 4,511,117 A | 4/1985 | Soderstrom |
| 4,546,502 A | 10/1985 | Lew |
| 4,601,210 A | 7/1986 | Brown |
| 4,612,120 A | 9/1986 | Box |
| 4,635,901 A | 1/1987 | Pond |
| 4,713,847 A | 12/1987 | Oldfelt et al. |
| 4,783,859 A | 11/1988 | Rozenblatt et al. |
| 4,811,754 A | 3/1989 | Wilhelm |
| 4,968,325 A | 11/1990 | Black et al. |
| 5,007,117 A | 4/1991 | Oldfelt et al. |
| 5,035,011 A | 7/1991 | Rozenblatt et al. |
| 5,048,130 A | 9/1991 | Brotman et al. |
| 5,065,786 A | 11/1991 | Rozenblatt |
| 5,099,867 A | 3/1992 | Emery |
| 5,142,712 A | 9/1992 | Hennessy |
| 5,187,818 A | 2/1993 | Barrett et al. |
| 5,231,706 A | 8/1993 | Kendall |
| 5,271,105 A | 12/1993 | Tyler |
| 5,317,763 A | 6/1994 | Frank et al. |
| 5,326,069 A | 7/1994 | Clear et al. |
| 5,344,085 A | 9/1994 | Hofseth |
| 5,372,710 A | 12/1994 | Frank |
| 5,464,191 A | 11/1995 | Shenk |
| 5,515,554 A | 5/1996 | Clear et al. |
| 5,535,770 A | 7/1996 | Nurmi |
| 5,604,938 A | 2/1997 | Tyler |
| 5,625,905 A | 5/1997 | Woods |
| 5,707,027 A | 1/1998 | Hiesener |
| 5,754,987 A | 5/1998 | Johansson et al. |
| 5,813,061 A | 9/1998 | Tornqist |
| 5,873,135 A | 2/1999 | Tornqvist |
| 5,909,968 A | 6/1999 | Olin et al. |
| 5,956,780 A | 9/1999 | Tyler |
| 6,085,366 A | 7/2000 | Pondelick et al. |
| 6,131,596 A | 10/2000 | Monson |
| 6,148,860 A | 11/2000 | Sigler |
| 6,152,160 A | 11/2000 | Bowden Wilcox et al. |
| 6,186,162 B1 | 2/2001 | Purvis et al. |
| 6,202,683 B1 | 3/2001 | Smith |
| 6,212,700 B1 | 4/2001 | Giesler et al. |
| 6,223,357 B1 | 5/2001 | Claas |
| 6,226,807 B1 | 5/2001 | Rozenblatt et al. |
| 6,240,575 B1 | 6/2001 | Polo Sanchez |
| 6,325,356 B1 | 12/2001 | Rozenblatt |
| 6,347,416 B1 | 2/2002 | Anderson et al. |
| 6,349,424 B1 | 2/2002 | Stradinger et al. |
| 6,349,425 B1 | 2/2002 | Stradinger et al. |
| 6,353,942 B1 | 3/2002 | Pondelick et al. |
| 6,370,709 B1 | 4/2002 | Stradinger et al. |
| 6,394,122 B1 | 5/2002 | Sibley et al. |
| 6,402,799 B1 | 6/2002 | Kokubo et al. |
| 6,453,481 B1 | 9/2002 | Pondelick et al. |
| 6,484,743 B2 | 11/2002 | Baukman |
| 6,502,278 B2 | 1/2003 | Oh et al. |
| 6,513,174 B1 | 2/2003 | Johansson |
| 6,536,054 B2 | 3/2003 | Anderson et al. |
| 6,536,055 B2 | 3/2003 | Pondelick et al. |
| 6,546,593 B2 | 4/2003 | Oh et al. |
| 6,575,425 B1 | 6/2003 | Betz |
| 6,648,002 B2 | 11/2003 | Lappalainen |
| 6,704,947 B2 | 3/2004 | Stradinger et al. |
| 6,729,368 B2 | 5/2004 | Nguyen |
| 6,732,386 B2 | 5/2004 | Anderson et al. |
| 6,748,973 B2 | 6/2004 | Lindroos |
| 6,763,531 B1 | 7/2004 | Huffman et al. |
| 6,883,188 B2 | 4/2005 | Sigler et al. |
| 6,977,005 B2 | 12/2005 | Erdmann et al. |
| 6,981,285 B2 * | 1/2006 | Sigler .................. B61D 35/005 4/434 |
| 7,118,677 B2 | 10/2006 | Hoffjann et al. |
| 7,127,749 B2 | 10/2006 | Ling |
| 7,156,363 B2 | 1/2007 | Parsons et al. |
| 7,169,305 B2 | 1/2007 | Gomez |
| 7,188,822 B2 | 3/2007 | Marcichow et al. |
| 7,331,365 B2 | 2/2008 | Nguyen |
| 7,690,053 B2 | 4/2010 | Pondelick |
| 7,921,478 B1 | 4/2011 | Vanini |
| 8,613,115 B2 | 12/2013 | Seibt et al. |
| 8,769,731 B2 | 7/2014 | Seibt |
| 8,887,320 B2 | 11/2014 | Dezarn et al. |
| 9,371,136 B2 | 6/2016 | Beach et al. |
| 2001/0034902 A1 | 11/2001 | Tyler |
| 2002/0069459 A1 | 6/2002 | Pondelick et al. |
| 2002/0145080 A1 | 10/2002 | Renken et al. |
| 2005/0173336 A1 | 8/2005 | Arnaud |
| 2006/0075546 A1 | 4/2006 | Sigler |
| 2007/0079432 A1* | 4/2007 | Shoikhet .................. E03D 5/10 4/406 |
| 2007/0226887 A1 | 10/2007 | Lappalainen et al. |
| 2007/0297894 A1 | 12/2007 | Dandasi et al. |
| 2008/0185477 A1 | 8/2008 | Seibt |
| 2010/0083433 A1 | 4/2010 | Pondelick et al. |
| 2010/0083435 A1 | 4/2010 | Hoang et al. |
| 2011/0107506 A1 | 5/2011 | Nasrallah |
| 2011/0173743 A1 | 7/2011 | Jensen et al. |
| 2012/0066824 A1 | 3/2012 | Dezarn et al. |
| 2014/0041109 A1* | 2/2014 | Stauber .................. E03D 3/12 4/325 |
| 2014/0101837 A1 | 4/2014 | Boodaghians et al. |
| 2014/0137319 A1 | 5/2014 | Beach et al. |
| 2014/0208498 A1 | 7/2014 | Beach et al. |
| 2014/0223655 A1 | 8/2014 | Dillard |
| 2014/0259343 A1 | 9/2014 | Wilson et al. |
| 2015/0013058 A1 | 1/2015 | Bucher et al. |

FOREIGN PATENT DOCUMENTS

| | | |
|---|---|---|
| WO | WO-02/06594 A1 | 1/2002 |
| WO | 2008010570 A1 | 1/2008 |
| WO | WO-2008/042728 A1 | 4/2008 |
| WO | WO-2012/146632 A1 | 11/2012 |

(56) References Cited

OTHER PUBLICATIONS

International Search Report and Written Opinion issued in related application PCT/US2016/024963, dated Aug. 16, 2016, 12 pages.
International Search Report and Written Opinion for PCT/US2016/024888, dated Aug. 2016, 10 pages.
International Search Report and Written Opinion for PCT/US2016/024909, dated Jun. 10, 2016, 7 pages.
International Search Report and Written Opinion for PCT/US2016/024936, dated Jun. 16, 2016, 6 pages.
International Search Report and Written Opinion for PCT/US2016/024983, dated Jun. 17, 2016, 9 pages.
Non-Final Office Action for U.S. Appl. No. 15/084,078, dated Jan. 5, 2018, 8 pages.
Ex Parte Quayle Action for U.S. Office Action on U.S. Appl. No. 15/084,257 dated Sep. 27, 2017. 7 pages.
Final Office Action for U.S. Appl. No. 15/084,185 dated Oct. 20, 2017. 12 pages.
U.S. Notice of Allowance on U.S. Appl. No. 15/084,257 dated Dec. 7, 2017. 7 pages.
Non-Final Office Action for U.S. Appl. No. 15/084,358 dated Sep. 27, 2017. 10 pages.
Office Action on U.S. Appl. No. 15/084,185 dated May 22, 2018. 8 pages.
Extended European Search Report in European Patent Application No. 16774058.8 dated Nov. 14, 2018. 11 pages.
Jaromir Jezny et al: "Position Measurement with Hall Effect Sensors", American Journal of Mechanical Engineering (Nov. 1, 2013) pp. 231-235.
Office Action on EP Application No. 16774085.1 dated Nov. 19, 2018. 9 pages.
Office Action on European Patent Application No. 16774064.6 dated Nov. 15, 2018. 8 pages.
Office Action on European Patent Application No. 16774075.2 dated Nov. 15, 2018. 7 pages.

\* cited by examiner

MAINTENANCE MODE FOR AIRCRAFT VACUUM TOILET

CROSS-REFERENCES TO RELATED APPLICATIONS

This claims the benefit of U.S. Provisional Patent Application No. 62/140,260, entitled "VACUUM TOILET SYSTEM AND INSTALLATION METHOD THEREOF," and filed on Mar. 30, 2015, the disclosure of which is incorporated herein by reference in its entirety.

FIELD OF THE DISCLOSURE

The present disclosure relates generally to vacuum toilet systems and more particularly, to maintenance modes for such systems.

BACKGROUND

Designing a toilet for an aircraft poses challenges that do not generally occur in ground-based toilet designs. For instance, in an aircraft, space and weight are at a premium, and using regular water-flush toilets is not practical. Also, performing routine maintenance and cleaning is much more difficult, since space restrictions make access to plumbing nearly impossible.

Flushing devices for an aircraft vacuum toilet generally require that after the use of the toilet, a flushing processing is actuated by triggering device. This is then followed by the supply of flushing liquid to the toilet bowl and subsequent opening of a suction valve, so as to pull waste, flushing liquid, and any other impurities into a waste tank.

Vacuum toilet systems often include a maintenance switch that permits operation for ground maintenance. However, there are drawbacks associated with existing systems. For instance, maintenance switches are often difficult to access.

DRAWINGS

While the appended claims set forth the features of the present techniques with particularity, these techniques may be best understood from the following detailed description taken in conjunction with the accompanying drawings of which:

DETAILED DESCRIPTION

Figure 1:
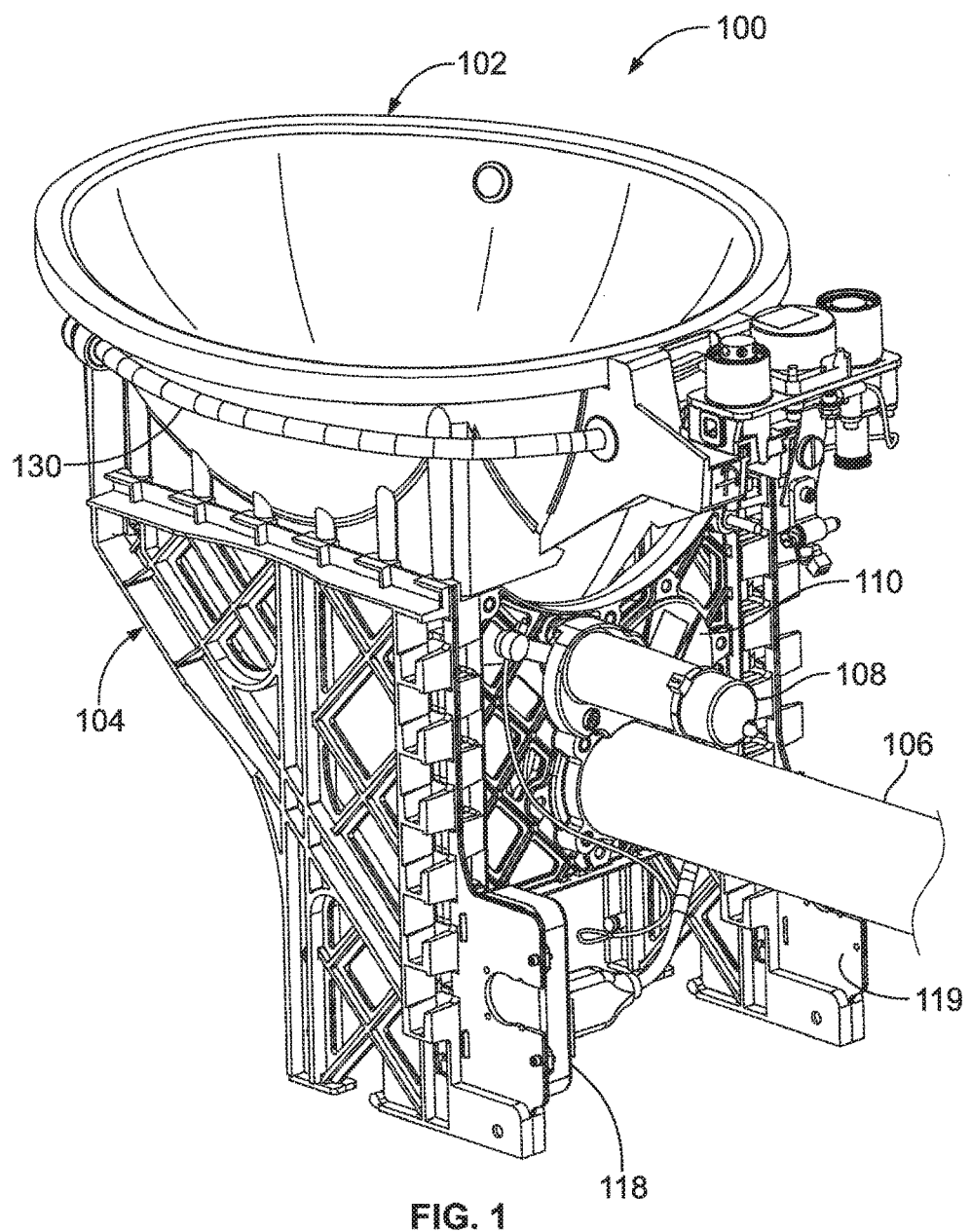
FIG. 1 is a perspective view of a toilet configured according to an embodiment.

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure, including claims, is limited to that embodiment.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

The disclosure is generally directed to a method and system for controlling a toilet on board an aircraft. According to an embodiment, a method of controlling an operation of a toilet system on-board an aircraft is disclosed. The toilet system includes a toilet bowl, a fluid valve controlling input of fluid into the toilet bowl, a flush switch configured to be activated by a user, and a controller configured to operate the fluid valve. The method includes detecting an activation of the flush switch, monitoring a flush switch activation time period, and determining whether the flush switch activation time period exceeds a preset threshold time period. In response to determining that flush switch activation time period does not exceed the preset threshold time period, a standard flush cycle is initiated. In response to determining that the flush switch activation time period exceeds the preset threshold time period, a maintenance mode is initiated allowing a larger volume of fluid to fill the toilet bowl for maintenance.

In an embodiment, the system includes a toilet bowl body comprising a toilet bowl and a shroud; a fluid valve configured to control the flow of fluid into the toilet bowl; a flush switch configured to be activated by an input from a user; and a controller configured to control the operation of the fluid valve; wherein the controller, upon detecting activation of the flush switch in a first sequence, controls the fluid valve to introduce a first amount of fluid into the toilet bowl for a first period of time; and the controller, upon detecting activation of the flush switch in a second sequence different from the first sequence, controls the fluid valve to introduce a second amount of fluid into the toilet bowl for a second period of time.

The term "logic circuitry" as used herein means a circuit (a type of electronic hardware) designed to perform complex functions defined in terms of mathematical logic. Examples of logic circuitry include a microprocessor, a controller, an application-specific integrated circuit, and a field-programmable gate array.

Turning to FIG. 1, a toilet configured according to an embodiment is shown. The toilet, generally labelled 100, is configured to be deployed on an aircraft, and may be housed within an external housing (not shown). The toilet 100 includes a bowl 102 attached to a frame 104. The toilet 100 also includes a waste pipe 106 attached at the waste outlet of the bowl 102 and a motor 108 attached to the frame 104. The motor 108 drives a mechanical actuator to open or close a door to the waste outlet.

The toilet 100 further includes a controller 118 attached to the frame 104. The controller 118 contains logic circuitry that controls the operation of the toilet 100. Although depicted on the back left side of the frame 104, the controller 118 may be attached to the frame 104 at other locations, such as the back right side (e.g., location 119). A cable 116 is attached to the controller 118 and to the motor 108. The cable 116 provides a transmission medium for electrical signals to travel from the controller 118 to the motor 108 (e.g., power and data) and for electrical signals to travel from the motor 108 to the controller 118 (e.g., data). For example, the logic circuitry in the controller 118 can transmit control signals to the motor 108 by way of the cable 116, and the motor 108 can transmit position signals to the logic circuitry by way of the cable 116. During operation, the door to the waste outlet is normally closed. When the logic circuitry in the controller 118 receives an activation signal (e.g., a signal generated by a "flush" switch on the toilet 100), the logic circuitry sends a control signal to the motor 108 to open the door to the waste outlet. A pressure difference between the air in the waste pipe 106 and the air around the outside of the toilet 100 creates a suction at the waste outlet, which draws the waste from inside the bowl 102 out of the waste outlet and into the waste pipe 106. After a predetermined period of time, the motor 108 drives the mechanical actuator to close the door.

Figure 2:
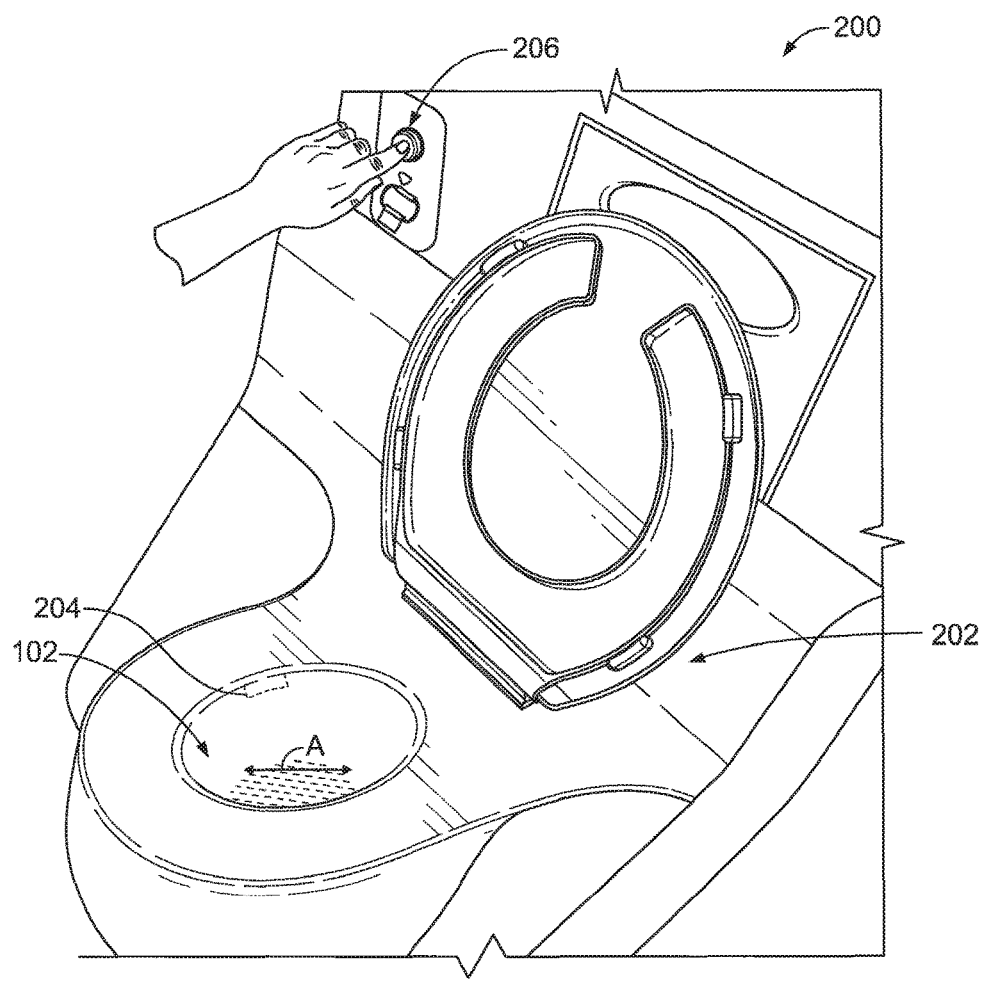
FIG. 2 is a perspective view of a toilet operating during a standard flushing sequence according to an embodiment.

Referring now to FIG. 2, a toilet system 200 configured according to the embodiment is shown. The toilet system 200 includes the toilet bowl 102, the fluid valve 130 controlling input of fluid into the toilet bowl, a flush switch 206 configured to be activated by a user, and the controller 118 configured to operate the fluid valve 130. The fluid valve 130 and the controller 118 are covered by the toilet shroud 202 as shown in FIG. 2. As can be seen in FIG. 2, the toilet bowl 102 is filled with fluid from the fluid valve 130 up to a level A during a standard mode flushing sequence.

Figure 3:
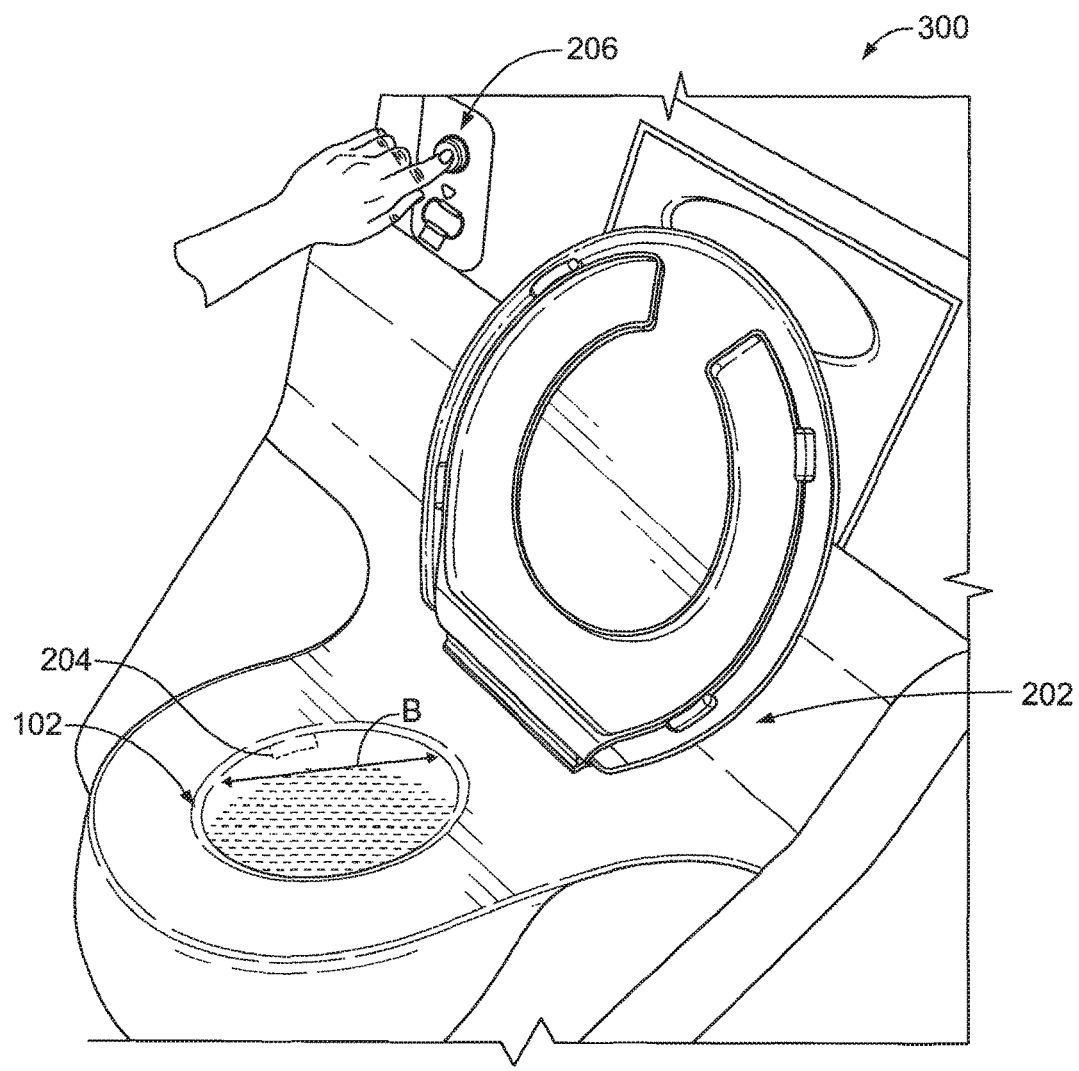
FIG. 3 is a perspective view of a toilet operating during a maintenance mode flushing sequence according to an embodiment.

FIG. 3 shows a toilet system 300 configured according to an embodiment operating during a maintenance mode flushing sequence. The toilet system 300 includes the toilet bowl 102, the fluid valve 130 controlling input of fluid into the toilet bowl, a flush switch 206 configured to be activated by a user, and the controller 118 configured to operate the fluid valve 130. The fluid valve 130 and the controller 118 are covered by the toilet shroud 202 as shown in FIG. 2. As can be seen in FIG. 3, the toilet bowl 102 is filled with fluid from the fluid valve 130 up to a level B during a maintenance mode flushing sequence.

Figure 4:
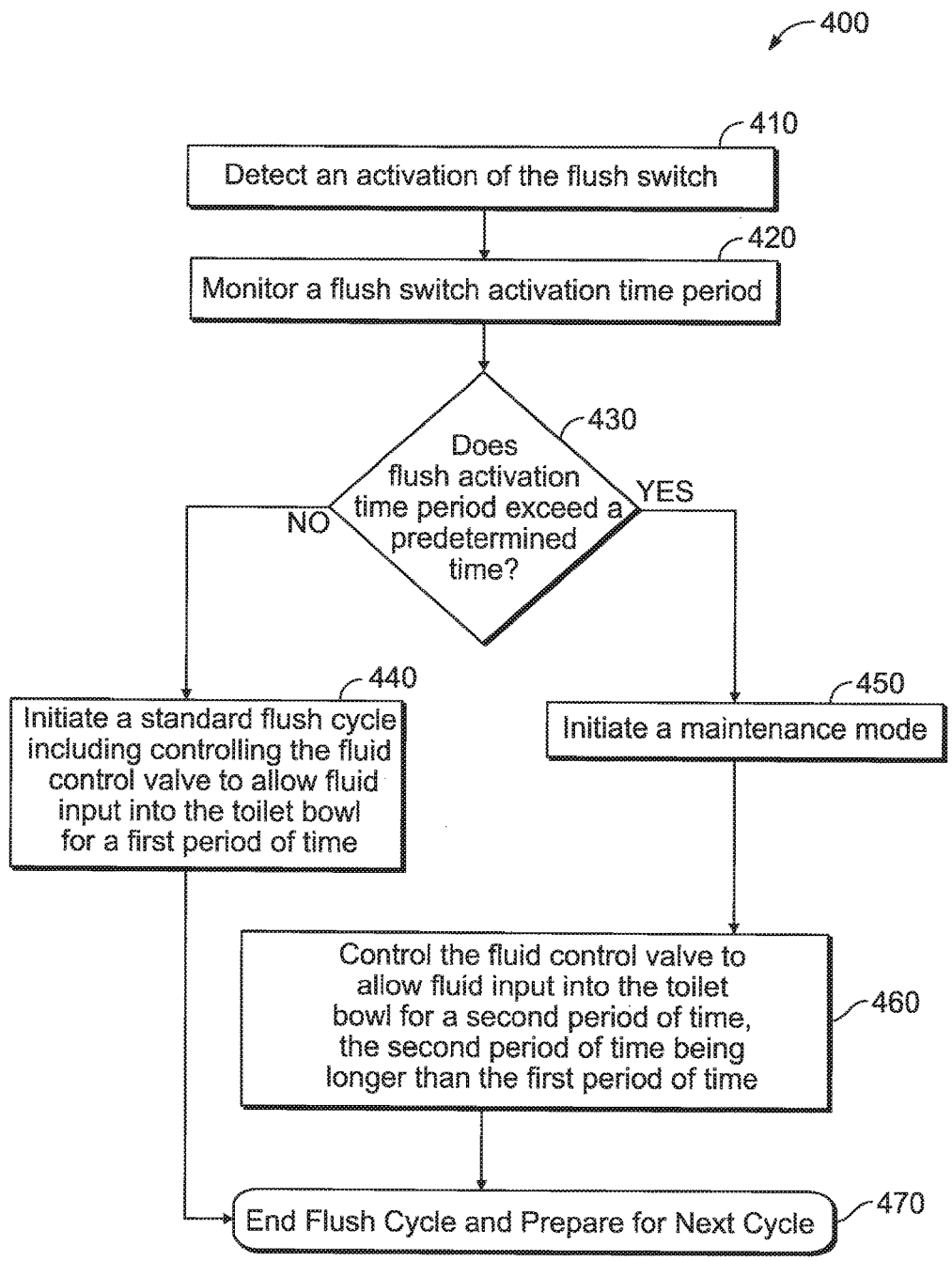
FIG. 4 is a block diagram depicting logic circuitry that may be used in an embodiment.

Turning now to FIG. 4, the operation of the toilet 100 is explained with reference to FIGS. 2 and 3. As can be seen in FIGS. 2 and 3, when a user activates the flush switch 206, fluid is transported into the toilet bowl 102 via the fluid valve 130. The controller is configured to monitor an activation sequence. At block 410, the controller 118 detects whether the flush switch 206 has been activated.

At block 420, the controller 118 monitors a time period for which the flush switch 206 has been activated. At block 430, the controller 118 makes a determination whether the flush switch 206 has been activated for a time period exceeding a preset threshold time period. In an embodiment, the preset threshold time period is set to be 2 seconds. Persons skilled in the art will understand that the preset threshold time period may be set for any desired amount of time.

In response to determining that the flush activation time period of the flush switch 206 does not exceed the preset threshold time period at block 430, the controller 118 initiates a standard flush cycle at block 440. In particular, the controller 118 sends a control signal to the motor 108 to open the door to the waste outlet. A pressure difference between the air in the waste pipe 106 and the air around the outside of the toilet 100 creates a suction at the waste outlet, which draws the waste from inside the bowl 102 out of the waste outlet and into the waste pipe 106. After a predetermined period of time, the motor 108 drives the mechanical actuator to close the door. According to an embodiment, the controller 118 then controls the fluid valve 130 to allow fluid input into the toilet bowl for a first period of time. As seen in FIG. 2, the toilet bowl 102 is filled with fluid reaching a preset level A to rinse the bowl 102 with the fluid. Finally, the controller 118 controls the door to the waste outlet to evacuate the contents of the bowl 102.

Alternatively, in response to determining that the flush activation time period of the flush switch 206 does exceed the preset threshold time period at block 430, the controller 118 initiates a maintenance mode flush cycle at block 450. In this instance, the controller 118 controls the fluid valve 130 to allow fluid input into the toilet bowl for a second period of time that is longer than the first period of time (during the standard flush cycle). As seen in FIG. 3, the toilet bowl 102 is filled with fluid reaching a preset level B to rinse the bowl 102 with the fluid where the preset level B is higher than the preset level A during the standard flush cycle. Finally, the controller 118 controls the door to the waste outlet to evacuate the contents of the bowl 102. Finally, the process ends at block 470 when the flush cycle is completed and the toilet is ready for use.

In an embodiment, the controller 118 monitors an activation sequence when activation of flush switch 206 is detected. In one embodiment, the controller 118 has preset activation sequences stored thereon. The controller 118 initiates a standard flush sequence when the user activates the flush switch 206 in accordance with a first sequence. The first sequence may be predetermined and stored in the controller 118 using known methods. In an embodiment, the controller 118 includes a processor configured to execute software stored on a non-transitory computer readable medium such as ROM, RAM, EEPROM, etc. In an embodiment, the predetermined first sequence may comprise activation of the flush switch 206 for a regular mode flushing time period. The regular mode flushing time period may be set to be any desired time duration. For instance, the regular mode flushing time period may be set to be 2 seconds in one embodiment.

The controller 118 initiates a maintenance mode flush sequence when the user activates the flush switch 206 in accordance with a second sequence. In an embodiment, the second sequence may comprise activation of the flush switch 206 for a maintenance mode flushing time period that is longer than the regular mode flushing time period. In another embodiment, second sequence of activation of the flush switch 206 may comprise activation of the flush switch for a period of 15 to 20 seconds. If the flush switch 206 is activated for less than 15 seconds, or for more than 20 seconds, a standard flush cycle may be initiated. In another embodiment, the second sequence of activation of the flush switch comprises alternatively pressing and releasing the flush switch a preconfigured number of times.

The maintenance mode flush sequence in accordance with the various embodiments discussed above may be initiated while the aircraft is in air or on the ground. In an embodiment, when the toilet system 300 is operating in a maintenance mode, the controller 118 may control the fluid valve 130 to allow fluid flow into the toilet bowl 102 while the flush switch 206 is pressed. In an embodiment, a sensor 204 may be provided at a rim portion of the toilet bowl 102. According to an embodiment, the controller 118 may be configured to close the fluid valve 130 when a fluid level in the toilet bowl is a predetermined distance away from the sensor 204 in order to prevent overflow.

Figure 5:
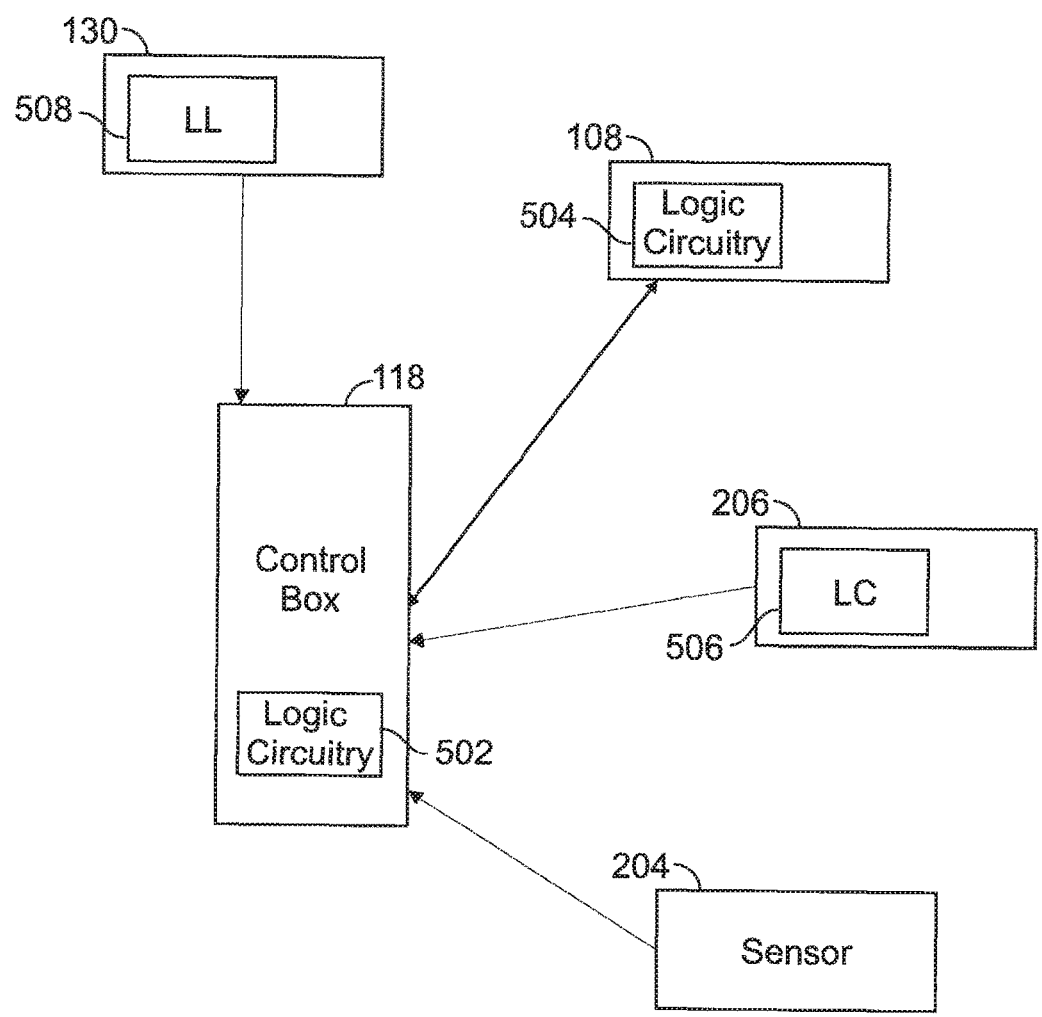
FIG. 5 is a flow diagram depicting a process that may be carried out in an embodiment.

Turning to FIG. 5, in an embodiment, the controller 118 includes logic circuitry 502 that generally controls the operation of the toilet 100, and the motor 108 includes logic circuitry that controls the operation of the motor 108. The fluid valve 130 includes logic circuitry 508. The controller 118 is also communicatively coupled to the sensor 204 as shown in FIG. 5. The logic circuitry 502 communicates with logic circuitry 504 of the motor 108, the sensor 206, the flush switch 206, and logic circuitry 508 of the fluid valve 130. In an embodiment, when the logic circuitry 502 of the toilet 100 carries out a start-up operation (e.g., a standard flush cycle sequence or a maintenance mode flush cycle sequence), the logic circuitry 502 communicates with the logic circuitry 504 of the motor 108, the sensor 206, the flush switch 206, and the logic circuitry 508 of the fluid valve 130 in accordance with the various embodiments described above. Although the above embodiment describes the controller 118 controlling the operation of the flush switch 206 directly, in other embodiments, the flush switch 206 may include additional logic circuitry 506 which interacts with the controller 118.

Figure 6:
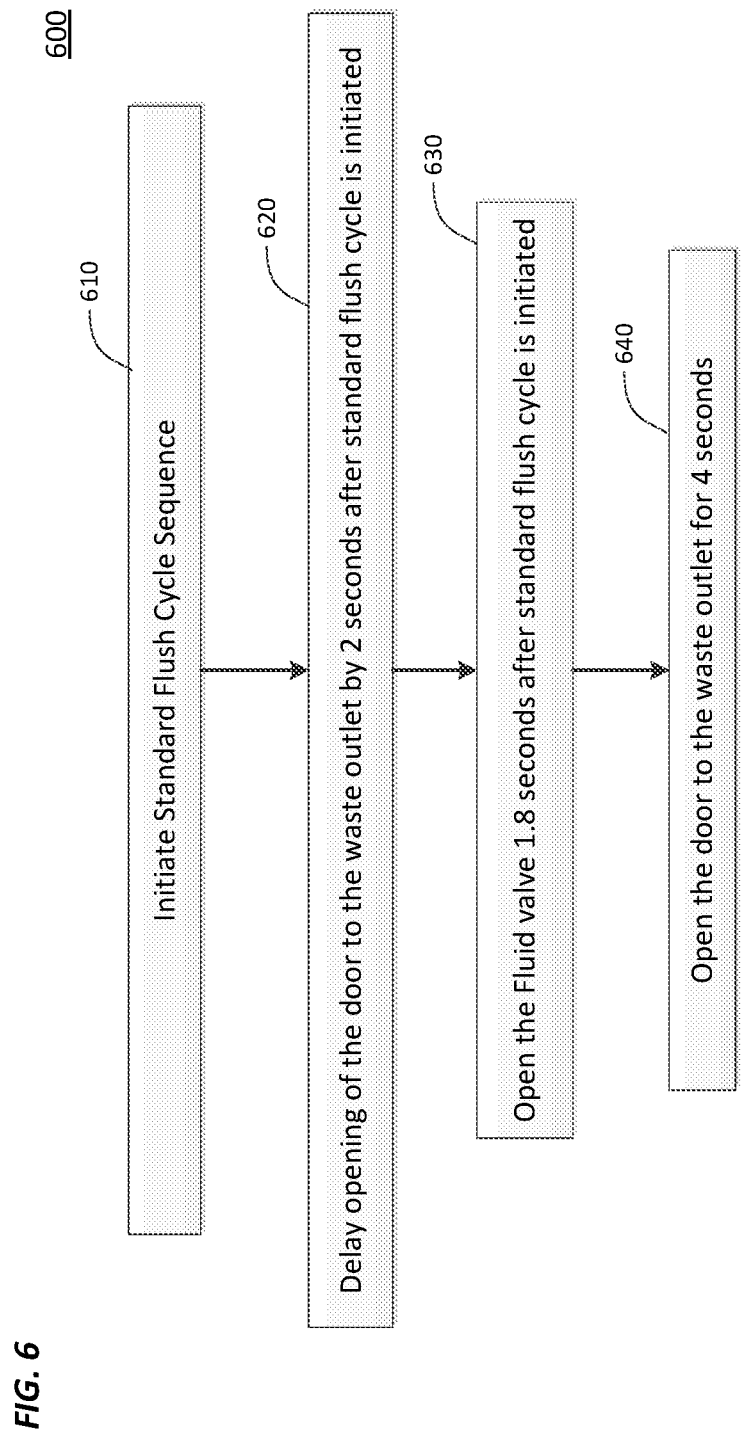
FIG. 6 is a flow diagram depicting the operation of a toilet system during a standard flush cycle sequence according to an embodiment.

FIG. 6 is a flowchart describing an exemplary embodiment of the operation of the toilet system 200 during a standard flush cycle sequence 600. At block 610, a standard flush cycle is initiated. The controller 118 delays opening of flush valve for 2 seconds after the standard flush cycle is initiated to allow vacuum pressure differential to build up in the waste tank at block 620. At block 630, the controller 118 operates the fluid valve 130 to allow fluid input into the toilet bowl 102 1.8 seconds after the standard flush cycle is initiated and introduce a flow of potable water to rinse the toilet bowl. Finally, at block 640, the controller 118 opens the door to the waste outlet for a period of 4 seconds to evacuate the contents of the toilet bowl 102, and then closes the door again. Persons skilled in the art will understand that the time periods discussed above are merely examples, and that the relevant time periods may be set as desired at the controller 118 using known methods.

Figure 7:
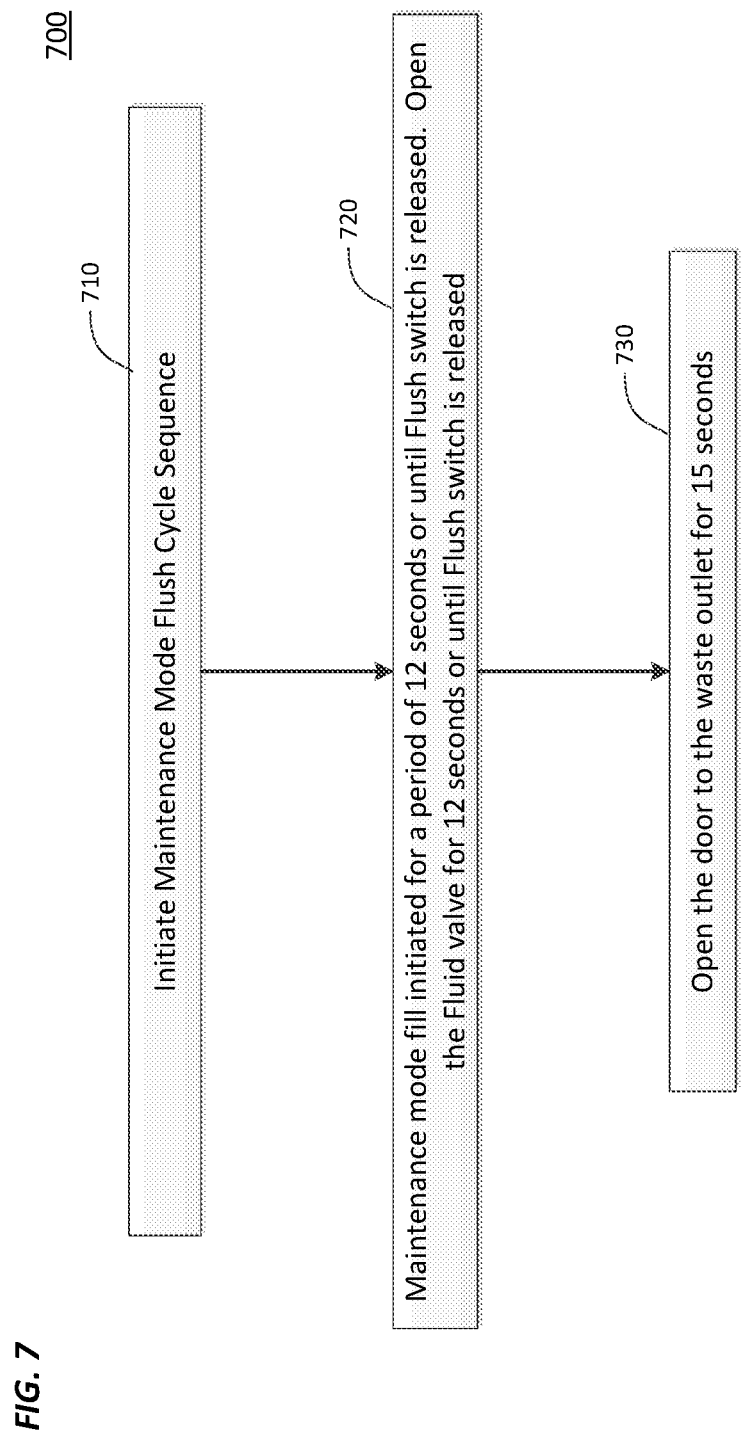
FIG. 7 is a flow diagram depicting the operation of a toilet system during a maintenance mode flush cycle sequence during an embodiment.

FIG. 7 is a flowchart describing an exemplary embodiment of the operation of the toilet system 300 during a maintenance mode flush cycle sequence 700. At block 710, a maintenance mode flush cycle is initiated. At block 720, the controller 118 operates the fluid valve 130 to allow fluid input into the toilet bowl 102 for a period of 15 seconds or until the flush switch is released after the maintenance mode flush cycle is initiated. In an embodiment, the controller 118 introduces up to 4 liters of potable water to rinse the toilet bowl 102. Finally, at block 730, the controller 118 opens the door to the waste outlet for a period of 20 seconds to evacuate the contents of the toilet bowl 102, and then closes the door again. Persons skilled in the art will understand that the time periods discussed above are merely examples, and that the relevant time periods may be set as desired at the controller 118 using known methods.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

The particular implementations shown and described herein are illustrative examples and are not intended to otherwise limit the scope of the disclosure in any way. For the sake of brevity, conventional electronics, control systems, software development and other functional aspects of the systems (and components of the individual operating components of the systems) may not be described in detail.

The steps of all methods described herein are performable in any suitable order unless otherwise indicated herein or otherwise clearly contradicted by context. No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The invention claimed is:

1. A toilet bowl system for use on-board an aircraft, the system comprising:
   a toilet bowl body comprising a toilet bowl and a shroud;
   a fluid valve configured to control the flow of fluid into the toilet bowl;
   a flush switch configured to be activated by an input from a user;
   a controller configured to control the operation of the fluid valve; wherein
   the controller, upon detecting activation of the flush switch in a first sequence comprising activation of the flush switch for a regular mode flushing time period, controls the fluid valve to introduce a first amount of fluid into the toilet bowl to a first preset level in the toilet bowl for a first period of time; and
   the controller, upon detecting activation of the flush switch in a second sequence different from the first sequence, the second sequence comprising activation of the flush switch for a maintenance mode flushing time period that is longer than the regular mode flushing time period, controls the fluid valve to introduce a second amount of fluid into the toilet bowl to a second preset level in the toilet bowl for a second period of time, the second preset level higher than the first preset level.

2. The system of claim 1, wherein
   the first period of time is shorter than the second period of time, and the first amount of fluid is less than the second amount of fluid.

3. The system of claim 1, wherein the second sequence of activation of the flush switch comprises alternatively pressing and releasing the flush switch a preconfigured number of times.

4. The system of claim 1, further comprising:
   a sensor positioned at a rim portion of the toilet bowl, wherein the controller is configured to close the fluid valve when a fluid level in the toilet bowl is a predetermined distance away from the sensor.

5. The system of claim 1, wherein the controller is configured to close the fluid valve after at least one of i) the second period of time has elapsed or ii) the second amount of fluid has been introduced into the toilet bowl.

6. A method of controlling an operation of a toilet system on-board an aircraft, the toilet system including a toilet bowl, a fluid valve controlling input of fluid into the toilet bowl, a flush switch configured to be activated by a user, and a controller configured to operate the fluid valve, the method comprising:

detecting an activation of the flush switch;

monitoring a flush switch activation time period;

determining whether the flush switch activation time period exceeds a preset threshold time period;

in response to determining that flush switch activation time period does not exceed the preset threshold time period, initiating a standard flush cycle and controlling the fluid valve to allow fluid input into the toilet bowl for a first period of time to a first preset level in the toilet bowl; and in response to determining that the flush switch activation time period exceeds the preset threshold time period, initiating a maintenance mode, wherein in the maintenance mode, the controller is configured to control the fluid valve to allow fluid input into the toilet bowl for a second period of time to a second preset level in the toilet bowl, the second period of time being longer than the first period of time, the second preset level higher than the first preset level.

\* \* \* \* \*